(12) United States Patent
Gross et al.

(10) Patent No.: US 8,402,767 B2
(45) Date of Patent: Mar. 26, 2013

(54) ENHANCED STARTING OF TURBINE ENGINES UNDER VARIOUS AMBIENT CONDITIONS USING OXIDIZER

(75) Inventors: Amichay H. Gross, Haifa (IL); Savely Khosid, Haifa (IL); Arie Peretz, Haifa (IL)

(73) Assignee: Rafael-Advanced Defense Systems, Ltd., Haifa (IL)

( * ) Notice: Subject to any disclaimer, the term of this patent is extended or adjusted under 35 U.S.C. 154(b) by 1132 days.

(21) Appl. No.: 12/474,390

(22) Filed: May 29, 2009

(65) Prior Publication Data

US 2010/0043444 A1     Feb. 25, 2010

Related U.S. Application Data

(63) Continuation of application No. PCT/IL2007/001467, filed on Nov. 28, 2007.

(30) Foreign Application Priority Data

Nov. 30, 2006 (IL) .......................................... 179762

(51) Int. Cl.
*F02C 3/26* (2006.01)
*F02C 7/264* (2006.01)
(52) U.S. Cl. ........ 60/781; 60/39.47; 60/39.821; 60/253; 60/789
(58) Field of Classification Search .................. 60/39.47, 60/39.821–39.827, 219, 234, 251–253, 752, 60/772, 778, 781, 789
See application file for complete search history.

(56) References Cited

U.S. PATENT DOCUMENTS

| | | | | |
|---|---|---|---|---|
| 3,084,504 A * | 4/1963 | McKinnon | ...................... | 60/252 |
| 4,023,994 A * | 5/1977 | Arendale | ..................... | 149/19.2 |
| 4,161,102 A | 7/1979 | Jasas et al. | | |
| 5,198,147 A | 3/1993 | Zhang et al. | | |
| 5,231,822 A | 8/1993 | Shekleton | | |
| 6,374,592 B1 * | 4/2002 | Box et al. | ........................ | 60/778 |
| 6,941,760 B1 | 9/2005 | Jones | | |

* cited by examiner

*Primary Examiner* — William H Rodriguez
*Assistant Examiner* — Karthik Subramanian
(74) *Attorney, Agent, or Firm* — Holtz, Holtz, Goodman & Chick, P.C.

(57) ABSTRACT

At least one solid mass of oxidizing-species-releasing material (ORM), selected as a solid oxidizer (SO), and/or as oxidizing-species-releasing burning substance (ORBS) is used as a device for enhancing the starting process of a turbine engine under various ambient conditions. The ORM is introduced into the combustion chamber of the turbine engine and the starting process of the turbine engine is initiated, by help of the igniter and in association with the ORM to enhance the starting process. In operation, an ORM selected as an SO releases gaseous oxygen when heated to decompose, while an ORM chosen as an ORBS discharges oxidizing species when ignited to burn. An ORM such as an SO or an ORBS may operate alone or in various combinations of both. The ORM is configured to release a predetermined mass flow rate of oxidizing species or of gaseous oxygen.

21 Claims, 2 Drawing Sheets

ENHANCED STARTING OF TURBINE ENGINES UNDER VARIOUS AMBIENT CONDITIONS USING OXIDIZER

The present application claims the benefit of Israel Patent Application No. 179762 filed on 30 Nov. 2006 and is a Continuation of PCT/IL 2007/001467 filed on 28 Nov. 2007

TECHNICAL FIELD

The present invention relates in general to the operation of turbine engines, and more particularly, to a method, a system, and a product for enabling and facilitating a rapid and reliable starting process of turbine engines under various ambient conditions.

BACKGROUND ART

Starting the operation of a turbine engine is an essential but also a difficult stage, in particular in the case of relatively small engines. Most often, small turbine engines, e.g. auxiliary power units, are optimized to operate within a limited operational regime requiring airflow pressure and temperature that may be quite different from the ambient conditions existing when the engine is started.

In broad terms, a turbine engine operates by intake of a mass of external air that passes through an intake section disposed in the fore portion of the engine, compresses that air by passing it through a rotating compressor, which is positioned in a compressor section accommodated downstream of the air intake. The compression process increases the pressure and the temperature of the air.

The compressed air then flows downstream into a combustion section including a combustion chamber, in which fuel is atomized or vaporized and mixed with a portion of the incoming air, whereas the remaining air gradually enters the combustion chamber to dilute and cool the gases produced by the combustion process. Next, the fuel-air mixture is ignited, whereby the temperature increases, and the combustion gases then flow downstream as exhaust gases to a turbine section, and through a turbine, which is rotated thereby. Typically, the turbine may be rotationally coupled to the compressor by a common shaft. From the turbine the exhaust gases flow downstream through an exhaust section, where their energy is used for driving an energy-consuming unit, or for producing thrust.

The various portions of a turbine engine, including the intake section the compressor, the combustion chamber, the turbine and the exhaust section as well as various auxiliary equipment that were not mentioned hereinabove but are necessary for proper operation of the turbine engine, are integrated in the engine containing the portions and sections mentioned hereinabove.

The combustion chamber includes typically, but not necessarily, an annular flame tube consisting of two concentric liners (perforated walls) and a dome that are connected upstream. The inner liner surrounds the shaft and the outer liner is mostly disposed in concentricity with and in the interior of a combustion chamber housing. It is pointed out that the inner and the outer liners may also be of any other shape, generally conical or of another shape, and not necessarily concentric, but concentric cylindrical liners will be described hereinbelow as an example selected for the sake of simplicity only.

A turbine engine has to be started and brought into operational regime before it can function and provide the desired power. The starting process may be initiated when the air pressure in the combustion chamber(s) is much lower than the specific values for which the turbine engine is designed, because, for example, of the low rotational speed and low compression of the air. Therefore, the conditions in the combustion chamber(s) may not produce sufficient energy for accelerating the rotational speed of the engine to its operational regime. Should harsh ambient conditions be encountered, the starting process will become harder to achieve, and may be even impossible without additional provisions.

Various solutions have been proposed to bestow enhanced starting capability on an engine. U.S. Pat. No. 5,231,822 by Shekleton, referred to hereinbelow as Shekleton, recites a turbine engine having an enhanced starting capability achieved by controllably bleeding compressed air from the air flow path by means of valves and ducts. Thereby, Shekleton adds components and weight in the form of peripheral equipment in order to improve the starting process.

Most solutions include a combination of some kind of an external igniter (usually a pyrotechnic, spark-plug, glow-plug, pilot flame or other) and an external pressurized oxygen tank. The igniter provides heat into the combustion chamber for the purpose of igniting the fuel-air mixture, whereas the oxygen added to the combustion chamber enhances the combustion process, enabling a more reliable starting. U.S. Pat. No. 6,941,760 by Jones, referred to hereinbelow as Jones, discloses a starting system for expendable gas turbine engines having a pressurized oxygen tank (at some 5000-7000 psig). The oxygen flows into the turbine engine through two lines, one providing an impinging jet on the compressor blades, for rotation of the rotating assembly, and the other entering directly into the combustion chamber. The solution presented by Jones demands the installation in the engine of additional equipment such as tubes, valves and regulators, and further ancillary equipment, all of which are rather voluminous and heavy. Another disadvantage of this solution resides in the necessity to add equipment that operates only during the starting process, but remains on-board to become deadweight ballast after the starting procedure is completed.

Under favorable ambient conditions, a high-energy igniter may be sufficient for supplying the necessary addition of energy to the combustion chamber. Most high-energy igniters are pyrotechnic, normally disposed on the inner or outer side of the housing, outside of the combustion chamber, while the hot gases are discharged into the combustion chamber via a nozzle. U.S. Pat. No. 6,374,592 by Box et al., referred to herein below as Box et al., recites a turbine engine with an internal quantity of solid fuel. The patent describes a solid fuel element, with an igniter that are both disposed in the inner space of the combustion chamber of a turbojet engine. No available oxygen is discharged or may be used for enhancement of the combustion process of the fuel-air mixture under harsh conditions. Actually, Box et al. replaces the external pyrotechnic igniter, well-known in the art, by an internal one.

U.S. Pat. No. 4,161,102 to Jasas et al., referred to herein below as Jasas et al., recites a turbine engine starting system that comprises an auxiliary combustion chamber having a source of combustible fuel and oxidizer connected to the combustion chamber. A fluid passage is linked at one end to the auxiliary combustion chamber and at its other end is open to the turbine blades to rotatably drive the turbine engine. A portion of the hot exhaust gases from the auxiliary combustion chamber is preferably diverted and injected with supplemental oxygen into the main combustion chamber of the turbine engine. Jasas et al. thus require an auxiliary combustion chamber in addition to the conventional combustion chamber(s). Evidently, Jasas et al. requires the addition of weighty hardware dedicated to the starting process.

Therefore, it would be advantageous to provide a method for the implementation of a system and of a product designed for the enhancement and assurance of the starting procedure for turbine engines under various ambient conditions, but without requiring either the addition of any equipment remaining coupled to the turbine engine after completion of the starting procedure, or demanding the jettisoning of devices becoming superfluous after the starting procedure is concluded.

DISCLOSURE OF THE INVENTION

The starting process of a turbine engine, and especially a small-sized one, is known to be difficult. This is due to the fact that most small turbine engines have a S narrow range of rotational speed (RPM—revolutions per minute), in which they are able to maintain self-sustained operation. The minimal rotational speed at which the turbine engine can maintain self-sustained operation is referred to as the idle speed (usually at 50%-60% of the maximal RPM or design point).

In small turbine engines, the starting device, or starter (may be electric, gas pressure driven, pyrotechnic or other), usually rotates the rotating assembly, or rotor, which consists of the compressor, the turbine, and the shaft, to a rotational speed that is lower than the idle speed. From that point on, the combustibles in the combustion chamber are ignited, and the evolving process should raise the RPM above the idle level, and bring the engine into its operational self-sustained regime.

In some cases, a rapid, continuous and reliable starting is required, e.g. in emergency power generators, auxiliary power units, expendable engines and others. In such cases, it may be required to have a one-shot reliable starting process, promising that the engine will start at first attempt, and not require repetition of the starting sequence.

As long as the actual number of RPM is lower than the number of idle RPM, the amount of air driven into the engine by the compressor is relatively low, and may be insufficient for maintaining a self-sustained flame in the combustion chamber. Moreover, the flame may be self-sustained, but the amount of energy provided by the combustion process may not be sufficient for accelerating the rotor to the required number of RPM, or, at least to the idle number of RPM. Both cases occur due to an insufficient amount of oxygen in the primary combustion zone, or PZ, where the fuel is burned with the air. Those problems may be further worsened by harsh ambient conditions, such as low ambient density or pressure.

In the present invention, the solution to this problem is achieved by the addition of oxygen into the combustion chamber during the starting process of the turbine engine. The added oxygen prevents oxygen-starvation of the combustion chamber, enabling the combustion chamber to provide enough energy, in the form of hot gases passing through the turbine wheel, to accelerate the rotor up to operational-regime number of RPM.

It is well known that the addition of oxygen to a combustion chamber drastically improves the starting process of turbine engines (see Chen et al., "Effect of Oxygen Addition on Ignition of Aero-Gas Turbine at Simulated Altitude Facility", J. Energy, Vol. 6, No. 6, November-December 1982, pp. 425-429).

In contrast with the prior art, making use of a high-pressure oxygen tank, in the present invention the added oxygen may be produced by the release of oxidizing species. For example, the discharge or release of oxidizing species may be achieved by thermal decomposition or by combustion of a solid mass (block, capsule, grain, cylinder, pellet or other) of a material, or a compound that contains a large portion of oxygen. The solid mass is appropriately configured and disposed in the combustion chamber where it is initially heated or set to burn by the ignition process. The ignition may be realized by any igniter, implemented as a pilot flame, a pyrotechnic igniter, a fuel spraying system with a spark plug, or with a glow plug, creating a local pilot flame in the combustion chamber, or any other ignition method. It is noted that in the case of a pyrotechnic igniter or a pilot flame, the igniter releases sufficient heat to initiate the thermal decomposition process or the ignition of an oxidizing-species-releasing material, or ORM, such as respectively, a solid oxidizer, or SO, and an oxidizing-species-releasing burning substance, or ORBS. An ORM is considered as being at least one SO, or at least one ORBS, or an association of both at least one SO and at least one ORBS.

A mass of solid oxidizer may be made of any chemical substance that releases gaseous oxygen when heated. This process is called thermal decomposition. The substances used may include, but are not limited to, such materials as perchlorate, nitrate, peroxide, and chlorate compounds, or appropriate mixtures thereof.

Alternatively, a mass of oxidizing-species-releasing burning substance, ORBS, may be implemented out of any chemical substance that releases oxidizing species when ignited to burn. An ORBS is thus a solid mass of material that once ignited, burns in a self-sustained combustion process while releasing oxidizing species.

The shape and size of the solid mass may be determined according to the amount of oxygen required, and the configuration of the specific combustion chamber. The mass may be designed to fit most common combustion chambers, and may be used as a retrofit for existing engines, to broaden their starting envelope and increase their starting reliability. This may be necessary, for example, when the purpose or mission of an existing engine, having a slow starting process, is changed. In such cases, the engine must be retrofitted with a reliable one-shot starting system.

Chemical oxygen generators are known per se.

For example, U.S. Pat. No. 5,198,147 by Zhang, et al., referred to as Zhang, recites a chemical oxygen generator including an oxygen-generating candle having an oxygen source, which upon decomposition will yield oxygen, and a nontoxic additive to smooth decomposition and suppress formation of toxic chlorine gas. The oxygen generator preferably includes a canister, oxygen-generating candle, and an ignition device. Triggering of the ignition device ignites an ignition pellet, which initiates decomposition of the candle body. Once initiated, the candle will sustain decomposition to release breathable oxygen until the candle is completely reacted.

Furthermore, U.S. Pat. No. 5,804,146 by Heyer, et al., referred to as Heyer, discloses a chemical oxygen generator with a chemical mass, which is accommodated inside a container to generate oxygen by a chemical reaction, and is held in the container by a gas-permeable fibrous material.

Zhang and Heyer recite applications that are totally different from the present application, even though related to oxygen generation.

SUMMARY OF THE INVENTION

In summary, when starting a turbine engine, a compressor drives a mass of compressed air into a combustion chamber wherein fuel is introduced, possibly by vaporization or atomization, and mixes with the air. Then, an igniter initiates the burning of the mixture, which provides a flame adding energy to sustain the burning process. Desirably, the flame remains self-sustained after the end of the igniter operation.

However, in some cases, this flame does not produce sufficient energy to accelerate the engine above idle RPM, not enabling the engine to complete the starting process. In the present invention, one option is for the initial flame to heat a solid oxidizer block and initiate its thermal decomposition, causing the solid oxidizer block to release gaseous oxygen into the combustion chamber. Alternatively, an oxygen-rich solid propellant grain may be ignited to burn and release oxidizing species. Since the combustion chamber is fuel-rich during the starting process, the addition of oxygen or oxidizing species will enable more fuel to burn with it and increase the energy of the hot gas passing through the turbine wheel, thus accelerating the rotor to reach the idle number of RPM, determined by the ambient conditions, and to attain designed operational regime. If a pyrotechnic igniter or a pilot flame is used to ignite the combustible mixture, the heat of the igniter, or the stream of hot gases released by a pyrotechnic igniter or the pilot flame itself is/are sufficient to either initiate the thermal decomposition process of the solid oxidizer, or to ignite the oxygen-rich solid propellant grain.

It is an object of the present invention to provide a method, a system, and a device as measures for enhancing the starting process of a turbine engine. The turbine engine has means for the ingestion and compression of air, means for supplying fuel injection, and means for creating a controllable combustible mixture of fuel with air, as well as means for operating at least one igniter for releasing heat, for transferring heat, and for initiating ignition of the combustible mixture. The turbine engine means comprise initiating the starting process of the turbine engine in operative association with a mass of solid oxidizer or oxygen-rich propellant. There are included the steps of providing at least one solid mass of oxidizing-species-releasing material, or ORM, having an appropriate configuration, and selecting the ORM, alone and in combination, from the group consisting of solid oxidizers, or SO, and oxidizing-species-releasing burning substance, or ORBS. There are included measures for the at least one solid mass of ORM to be introduced into a combustion chamber of the turbine engine, and measures for initiating the starting process of the turbine engine in association with the at least one mass of ORM and with operation of the at least one igniter, whereby the starting process of the turbine engine is enhanced.

It is a further object of the present invention to provide measures by which the at least one solid mass of ORM is selected as an SO which is configured to release a predetermined mass flow rate of gaseous oxygen when heated, and in which heat transferred to the SO at least by operation of the at least one igniter decomposes the SO, thereby causing release of gaseous oxygen, whereby the starting process of the turbine engine is enhanced.

It is another object of the present invention to provide measures by which the at least one solid mass of ORM is selected as an ORBS which is configured to release a predetermined mass flow rate of oxidizing species when ignited to burn, and wherein the operation of the at least one igniter ignites the ORBS, thereby causing release of oxidizing species, whereby the starting process of the turbine engine is enhanced.

It is yet an object of the present invention to provide measures, by which the at least one solid mass of ORM is selected as an ORBS and combined with at least one solid mass of SO. Both masses are configured to release a predetermined mass flow rate of oxidizing species. Operation of at least one igniter ignites the ORBS thereby causing burning thereof and release of heat and of oxidizing species. At the same time the igniter efflux heats the SO, thereby causing its decomposition and release of gaseous oxygen. In this way the starting process of the turbine engine is enhanced.

It is still an object of the present invention to provide measures by which the at least one mass of ORM is configured as at least one unitary mass of material.

It is yet another object of the present invention to provide means by which the at least one mass of ORM is configured for disposition into a turbine engine, for replacement of a depleted ORM, and for retrofit installation into an existing turbine engine.

It is furthermore an object of the present invention to provide measures by which the SO is configured to include substances selected alone and in combination from the group consisting of perchlorate, nitrate, peroxide, and chlorate compounds.

It is yet a further object of the present invention to provide measures by which the ORBS is configured to include substances selected in combination from the group of mixtures or compounds consisting of elastomeric binders, inorganic oxidizers, organic plasticizers and commonly-used additives.

It is still one further object of the present invention to provide measures by which the at least one solid mass of ORM is selected as an SO, the at least one igniter ignites the combustible mixture, and the heat provided by both the igniter and by the combustion of the combustible mixture heats the SO, which thermally decomposes to release gaseous oxygen.

It is yet a furthermore an object of the present invention to provide measures by which the at least one solid mass of ORM is selected as an ORBS and as an SO, the at least one igniter ignites both the combustible mixture and the ORBS which burns to release oxidizing species, and the heat provided by the igniter and by the combustion of the combustible mixture and by the burning of the ORBS heats the SO, whereby the SO thermally decomposes to release gaseous oxygen.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the application. In the following description, various embodiments of the present invention are described with reference to the following drawings, in which.

DESCRIPTION OF THE PREFERRED EMBODIMENTS

To ease the description, a generic gas turbine engine is described as an example only, even though the method, the system and the device are applicable to a wide range of turbine engines, either used to propel airborne, maritime, or ground-based vehicles, or used as a driver for machines, such as electric generators and other equipment.

Figure 1:
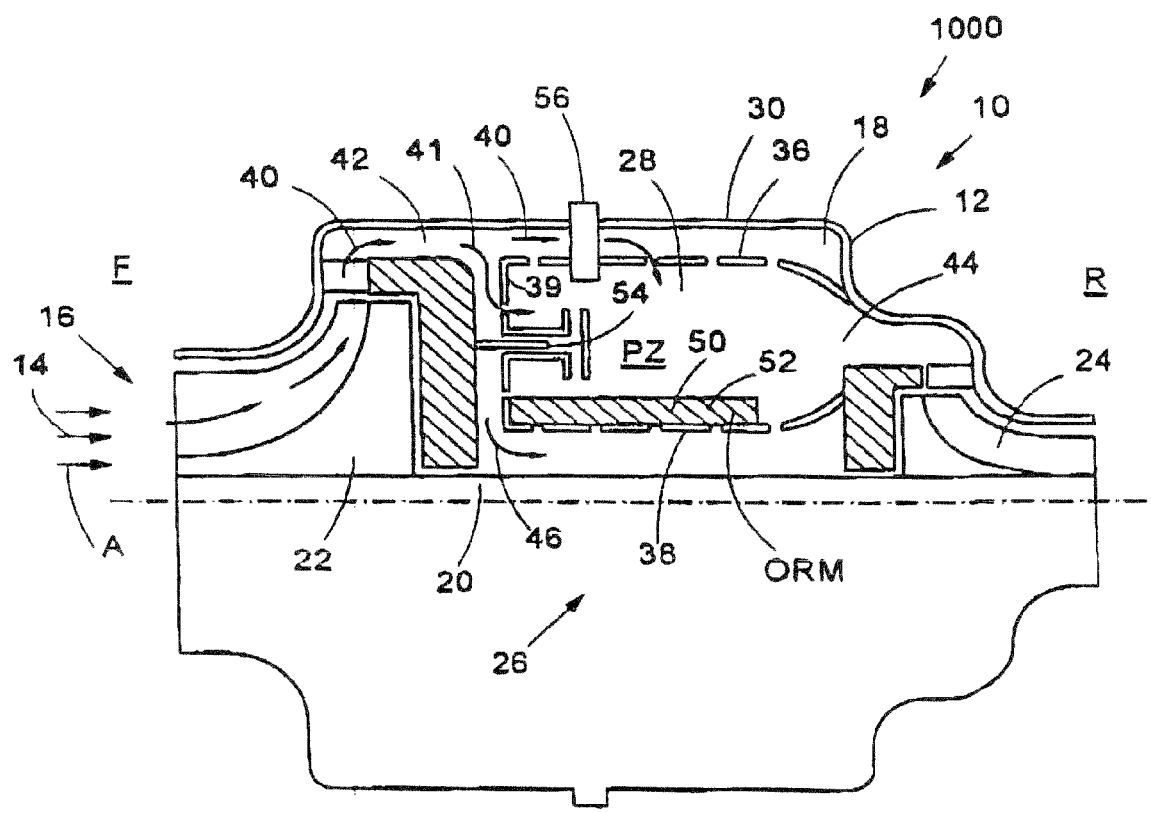
FIG. 1 shows a partial cross-section of a turbine engine with an oxidizing-species-releasing material configured as a block, capsule or grain.

FIG. 1 shows an embodiment 1000 of a turbine engine 10, or engine 10, provided with a mass of solid oxidizer SO or oxidizing-species-releasing burning substance ORBS, presented as a schematic exemplary embodiment of the method, system, and device operative with the present invention. Reference is now made hereinbelow to a simplified description of an engine 10, which is provided for the purpose of orientation and definition of nomenclature.

It is accepted that conventionally a turbine engine, and also the engine 10, is contained within a generally cylindrical engine housing 12, or housing 12, and has an air intake 16 which is disposed upstream, at the front F of the engine 10. In the interior 18 of the housing 12, an axially rotating shaft 20, or shaft 20, couples a compressor 22 to a turbine 24, which is disposed downstream of the compressor 22, towards the rear end R of the engine 10. The shaft 20 is supported by appropriate bearings, as well known in the art but not indicated in FIG. 1 for the sake of simplicity. Generally, the compressor 22, the shaft 20, and the turbine 24 are referred altogether as the rotating assembly 26, or rotor 26.

In the embodiment 1000, the interior 18 of the housing 12 is delimited by the generally cylindrical housing wall 30 and the shaft 20. The entire section of the interior 18 extending axially between the compressor 22 and the turbine 24 is referred to as the combustion chamber 28 of the engine 10. The combustion chamber generally includes a flame tube 44, and a plurality of, or at least one fuel inlet 54, and likewise, a plurality of, or at least one igniter 56.

In the embodiment 1000, the flame tube 44 consists of two coaxially disposed perforated cylinders, which are referred to as the outer liner 36 and the inner liner 38 that are both coupled at an upstream front-end by a dome 39 disposed adjacent to and downstream of the compressor 22. The outer liner 36 has a diameter smaller than that of the housing wall 30. The inner liner 38 has a diameter larger than that of the shaft 20 yet smaller than that of the outer liner 36, and is concentric with the outer liner 36. Both liners stretch from downstream of the compressor 22 to upstream of the turbine 24.

The perforated dome 39 connects the two liners, 36 and 38, at their upstream end. The volume of space disposed between the two liners, respectively 36 and 38, is referred to as the flame tube 44. The flame tube is retained in place by structural elements known in the art but not indicated in FIG. 1 for the sake of simplicity.

To start the operation of the engine 10, a starter is used to drive the rotor 26 up to a certain rotational speed. The rotational speed may depend on both the capabilities of the starter and ambient conditions. The starter is selected as one out of the varieties of starting devices well known in the art, but not shown in FIG. 1 for the sake of simplicity.

A mass of air 14 taken-in through the intake 16 and compressed by the compressor 22 is ducted to flow downstream and divides into two main streams. The first stream of air indicated by the arrows 40 flows into the peripheral space between the housing wall 30 and the outer liner 36, and enters into the internal space of the flame tube 44 through a set of openings, or perforations provided in the outer liner 36.

The second stream of air 41 flows in front of the dome, divides again into two flows. One flow enters the flame tube 44 through the dome 39, via the fuel vaporizers and/or via other air openings at the dome. The second flow of air 46 continues towards the space between the inner liner 38 of the flame tube 44 and the shaft 20, entering the flame tube 44 via a set of openings, or perforations, in the inner liner 38.

Fuel is supplied via a fuel supply system, known in the art but not indicated in FIG. 1 for the sake of simplicity, into the forward portion of the internal space of the flame tube 44, referred to as the primary zone PZ by a plurality of, or by at least one fuel inlet 54, or fuel injector 54, generally positioned on the dome 39 in the primary zone PZ, and usually implemented as an air-assisted vaporizer or a high-pressure atomizer, to facilitate vaporization or atomization of the fuel, respectively. Moreover, a control system for controlling and managing of the operation of the engine 10 is not shown in FIG. 1, still for the sake of simplicity.

The mixture of air and fuel introduced into the primary zone PZ is generally ignited by at least one igniter 56, most often selected as a spark-plug, a glow-plug, a pyrotechnic igniter, a pilot flame, or as another type of igniter, all well-know to the art. The igniter 56 may also contribute by heating, and thus vaporizing, the liquid fuel introduced into the primary zone PZ.

All of the incoming air A entering the engine 10, either taking part in the combustion process or else being heated and operating as working gas, reunites inside the flame tube 44 to exit through the turbine 24.

In the embodiment 1000, shown in FIG. 1, an oxidizing-species-releasing material, or ORM, is disposed in the interior of the combustion chamber 28. For example, the ORM is selected as a solid oxidizer SO, or as an oxidizing-species-releasing burning substance ORBS, implemented as a single mass forming a solid grain 50 configured as a cylindrical sleeve 52, which may be disposed in the combustion chamber 28, concentrically onto and around the exterior portion of the inner liner 38. Instead of the sleeve 52, a stack of plates of the same or of different size, and other configurations of the ORM are also practical. Evidently, both an SO and an ORBS may operate in association, and may have the same or a different configuration, size and mass.

To start the engine 10 into operation, a starter, not shown in the Figs., is operated to provide initial rotation of the compressor 22, so as to draw and compress the air A, through the air intake 16 and into the combustion chamber 28. The combustion products exiting from the combustion chamber 28 flow through the turbine 24, and from there to the exhaust section, not shown in the Figs. for the sake of simplicity.

Next, fuel is introduced into the flame tube 44 by the fuel inlets 54, being realized as vaporizers or atomizers or any other device used in the art. The igniter 56 is activated and begins its action by heating up, and thus evaporating the fuel introduced in the combustion chamber 28, allowing it to mix with the air. Then, the igniter 56 continues by igniting the mixture of fuel vapor and air that begins to burn in the primary zone PZ of the flame tube 44. Thereby, the combustion process is initiated.

When an SO is selected, the heat, provided by the combustion process and/or by the hot gases or even just by the heat emanating from the igniter, be it a pyrotechnic igniter or a pilot flame, heats up the mass of solid oxidizer SO, which undergoes thermal decomposition and releases gaseous oxygen. When an ORBS is selected as the ORM, the igniter 56 ignites the ORBS, which starts to burn and release oxidizing species.

It should be noted that the initial flame may be relatively weak under certain conditions. However, even a weak flame produces some heat and in the presence of a solid oxidizer SO that heat may be sufficient to start the decomposition of the solid oxidizer SO, at least locally, and to subsequently release gaseous oxygen. That released oxygen now provides an additional amount of oxygen to the flame, which, in association with the fuel, will strengthen the flame. The increasing heat will further decompose more of the solid oxidizer SO into gaseous oxygen that will burn with the fuel and the combustion process will become self-sustained.

Alternatively, when an ORBS is selected as the ORM, then, when combustion is initiated, the igniter 56 may also ignite the ORBS, which once ignited continues to burn in a self-sustained combustion process, releasing oxidizing species to feed the flame.

The flame, now provisioned with an additional amount of oxygen, enables the turbine 24 to accelerate the rotor 26 and reach idle rotational speed, which is the minimal threshold RPM of the engine's operational regime.

When the mass of ORM is selected as a solid oxidizer SO, then once heated, the SO releases gaseous oxygen that participates in the combustion process, a larger portion of the fuel burns, thus generating more heat into the internal volume of the flame tube 44. The mass of solid oxidizer SO is then further heated by the increased combustion, to further decompose and release more gaseous oxygen. In response to the increased energy supply to the gases driving the turbine 24 and rotating the compressor 22, the rotational speed of the rotor shaft 20 is increased and the compressor 22 draws more air through the intake 16, compressing it and driving it into the combustion chamber 28.

In the alternative, when a mass of ORBS is selected as an ORM, then once ignited, the ORBS provides the same results as those achieved with a mass of SO. As another alternative, a mass of SO and a mass of ORBS may be selected, inserted into the combustion chamber 28, and operate together in association to enhance the starting process of a turbine engine 10. Under moderate ambient conditions, an engine 10 equipped with an SO, or an ORBS, or with both, will be provided with an addition of oxygen in the combustion chamber, enabling a more rapid and reliable starting process. Thereby, the engine 10 reaches idle RPM quicker than an engine not having the benefit of an ORM.

When it is desired to start a turbine engine 10 under harsh ambient conditions, especially under conditions of low air pressure or density, the starting process becomes much more difficult and is much less reliable. However, the addition of oxygen, by means of an SO or of an ORBS, or of a combination of both SO and ORBS, will improve the conditions inside the combustion chamber 28 and is expected to relieve the difficult situation.

It is thus understood that the presence of an ORM always enhances and ensures the efficiency of the starting process, by supplying extra oxygen to help the engine 10 to accelerate to idle RPM, and from there to full operational capability. The presence of an ORM will always shorten the duration and increase the reliability of the starting process, and especially so under harsh ambient conditions.

FIG. 1 is a schematic partial cross-section, wherein only one fuel injector 54 and one igniter 56 are visible. However, if desired, any practical combination is possible with one or more than one of both the fuel injector 54 and the igniter 56. More than one igniter 56 may be disposed in each combustion chamber 28 for the sake of redundancy, to enhance the reliability of the starting process of the turbine engine 10.

If desired, more than one separate unit mass of ORM may participate in the starting procedure. Thus any practical combination of a single or a number of ORM grain(s) 50, fuel injector(s) 54, and igniter(s) 56 is possible.

Figure 2:
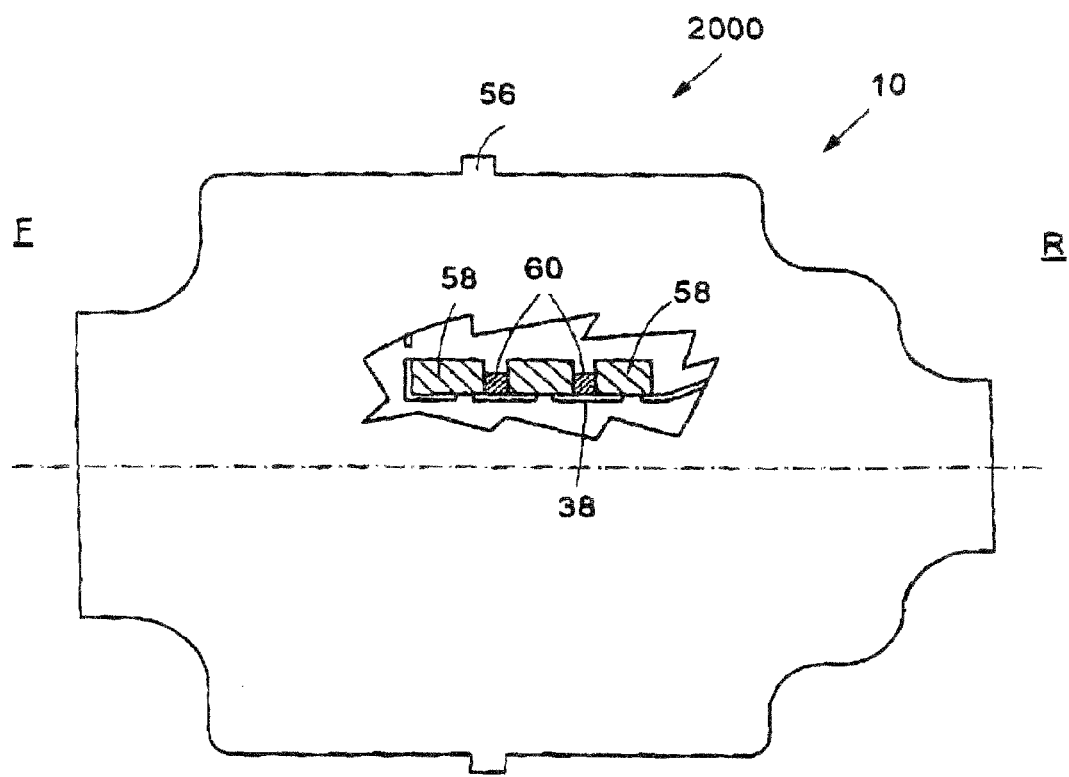
FIG. 2 depicts another embodiment, different from FIG. 1.

FIG. 2 partially illustrates a second embodiment 2000, which is a variant of the embodiment 1000, having, for example, three-unit first rings 58, or first disks 58 of ORM, selected for example as a solid oxidizer SO, that may be mutually separated by second disks 60, such as second inert rings 60, and form a stack if desired. Rings 58 of ORBS may replace the rings of SO. Moreover, the first rings 58 and the second rings 60 may possibly be implemented as alternate or successive rings 58 and 60 of respectively, SO and ORBS, or vice versa. It is noted that the first rings 58 and the second rings 60 may be of the same or of different configuration and size. Other configurations, shapes, and sizes of ORM are possible, in combination with one or more than one ORM, fuel injector(s) 54, and igniter(s) 56. Common to all combinations is the fact that after use, the ORM is completely depleted and that the decomposition or combustion products are expelled, whereby the turbine engine regains its original configuration, being that of a conventional or other turbine engine 10. Hence, since the use of a mass of ORM is an add-on to a turbine engine 10, any turbine engine 10 may possibly receive the disposition therein of one or more units of ORM material at the time of original manufacturing, or as a replacement after use and depletion, or as a retrofit for installation into an existing turbine engine. A retrofit of the solid grain 50 of ORM may be performed in many ways.

The solid ORM may be manufactured using any method or technology available and may vary in shape, to accommodate the combustion chamber being retrofitted, as long as the method of manufacture and installation will allow positioning the ORM in such a location that will enable heating or ignition by the initial flame and/or by the igniter 56. It is noted that even the heat released solely by the igniter 56 will cause decomposition of the solid oxidizer SO and the release of oxygen gas.

Even though depicted as a cylindrical sleeve 52 in FIG. 1, the solid mass of grain 50 may be implemented differently, and also shaped and sized as desired, as long as the thermal decomposition process for an SO, and the proper ignition in the case of an ORBS, required to promote the delivery of the necessary quantities of oxygen to the combustion process taking place in the combustion chamber 28 is accommodated. The solid ORM may be configured, for example as a plurality of, or at least one mass such as a block, rod, plate, or grain. The size and shape of the solid grain 50 is selected to accommodate the practical configurations required to match various types of different turbine engines, limited only by the geometry of the engine 10 and the disposition of the fuel inlet 54 and the igniter 56.

This last statement assumes that sound engineering accompanies the design of the setup, namely at least taking into account the relative disposition, configuration, manufacturing related characteristics, and orientation of the solid grain(s) 50, of the fuel inlet(s) 54, and of the igniter(s) 56.

In the preferred embodiment 1000, the mass of solid grain(s) 50 is disposed around the inner liner 38, and may be supported, if desired, and may even be disposed in the interior of one or more of the available combustion chamber(s) 28. Although possibly distributed in separate portions, the mass of solid ORM must be configured into at least one unitary portion.

A solid ORM device may thus enhance the start of a turbine engine IO having means for ingesting and compressing air, for supplying fuel and for creating a controlled combustible mixture of fuel and air, and for igniting the created controlled mixture of fuel and air. The solid ORM device may be configured and selected as at least one mass of ORM operative in association with the turbine engine 10 when introduced into a combustion chamber 28, to provide an enhanced starting process, which spans from standstill to at least until a threshold operative level of the turbine engine is achieved.

Since the decomposition of a solid oxidizer SO, or the burning of an ORBS, does not involve the presence and operation of any ancillary support equipment during the starting process of the turbine engine 10, retrofit installation into existing engines is a viable option. At the end of the starting process of the turbine engine, after complete thermal decomposition of the solid oxidizer, and/or complete burning of the ORBS is accomplished, there is neither additional weight left nor additional volume occupied as a dead weight ballast or superfluous volume in relation with the engine. If desired, it is possible to replace the depleted solid-phase ORM device by a new one to permit reuse of the engine 10.

In the preferred embodiment 1000, a solid grain 50 of SO may be made mainly of potassium perchlorate particles, which on thermal decomposition releases about 46% of their mass as gaseous oxygen. It is the provision of oxygen gas into the fuel-rich combustion chamber that is important to the starting process. The method of manufacture and the shape and size of the solid oxidizer may differ from one implementation to another. It should be noted, that an engine 10 may accept more than one device configured as a unitary mass of solid oxidizer, possibly having different shape and size.

Preferably, the solid oxidizer is selected from the group consisting of perchlorate, nitrate, peroxide, and chlorate compounds, such as potassium perchlorate, or KClO4.

However, the solid grain 50, or block 50, may be made by consolidation of particles, powder, pellets, or granules of one or of a multi-fraction mixture of the compounds described in the disclosure of the invention, with an appropriate particle-size distribution, and a suitable binder, such as polyester.

In a preferred embodiment 1000, the mass of solid-phase oxidizer SO is produced by hot iso-static pressing (HIP) or compaction of oxidizing compound particles or of a multi-fraction mixture of compound particles coated with a polymer or co-polymer, such as Viton A, which serves as a high-density binder. The aforementioned co-polymer also diminishes the hygroscopic property of the particles, if existing, and greatly contributes to their insensitivity, allowing the solid oxidizer SO to better withstand harsh ambient conditions.

In broad terms, the solid oxidizer mass is made of a compound or a material which releases gaseous oxygen upon heating, and may be implemented as a solid-phase grain made by consolidation or compaction of particles of potassium perchlorate, or KClO4. If desired, the particles of potassium perchlorate are coated with a polymer or a co-polymer before compaction, such as for example with a Viton A copolymer.

Peretz et al., in their paper "Hydrazine-Based Inverse Hybrid Engine for Space Applications" (presented at the $32^{nd}$ AIAA/ASME/SAE/ASEE Joint Propulsion Conference, 1966) and in their Israeli Patent No. 112592 (Aug. 17, 1999), provide details about the performance, characteristics, and methods for an iso-static consolidation manufacturing process that may be used for the implementation of the solid oxidizer SO.

Account is also taken of the fact that a turbine engine 10 fitted with a solid ORM is safer for storage in contrast with the prior art using high-pressure bottles of oxygen, for example.

As described hereinabove, an ORBS is also practical, either for use alone in replacement of an SO, or in association with an SO.

Oxidizing-species releasing burning substances, or ORBS may be mixtures or compounds of fuel(s) or binder(s), oxidizer(s), plasticizer(s) and common additives. On burning, an ORBS yields combustion products containing oxidizing species.

Fuels or binders, also called elastomeric binders, or binders for short, such as used with solid-propellant grains, or SPGs, include, amongst others: Hydroxyl-Terminated PolyButadiene, or HTPB, Glycidyl Azide Polymer, or GAP, and PolyGlycidyl, or PG. Oxidizers may include commonly-used inorganic compounds, such as Ammonium Perchlorate, or AP, Potassium Perchlorate, or KP, and Ammonium Nitrate, or AN, for example. Plasticizers, which are added to the binder to facilitate the casting process and enhance the mechanical properties of the SPGs, may include organic compounds, such as Butanetriol Trinitrate, or BTTN, and Trimethyllolethane, or TMETN. Additives may typically include bonding, curing and wetting agents, as well as antioxidants, catalysts, and stabilizers, as well known in the art. As a typical example, an ORBS is a mixture or a compound consisting of 5-20% GAP, 50-90% KP or a mixture of KP and AP, 10-22% BTTN, and 0.5-3.5% additives.

The ORBS may be implemented as a single solid mass that forms a solid grain 50 configured as a cylindrical sleeve 52, which is disposed concentrically onto and around the exterior portion of the inner liner 38. The ORBS may be configured in any desired practical shape, mass, or size, similarly to the configurations described hereinabove for an SO.

To start the engine 10 into operation when using an ORBS, the procedure is similar to the description detailed hereinabove with regard to the SO. The igniter 56, once activated, simultaneously ignites both the mixture of fuel vapor and air as well as the ORBS, that both begin to burn in the primary zone PZ of the flame tube 44, wherein the ORBS is disposed. Thereby, the combustion process is initiated and the ORBS burns while releasing oxidizing species, thus supplying additional oxygen to the combustion process. The combustion of the ORBS is a self-sustained process once initiated. Just as with the previously described SO, the ignited flame, now provisioned with an additional amount of oxygen, enables the turbine 24 to accelerate the rotor 26 and reach idle rotational speed, which is the minimal threshold RPM of the engine's operational regime.

The starting behavior and the performance of an engine 10 equipped with an ORBS, under moderate and harsh ambient conditions is the same as for an engine wherein an SO is disposed.

In the same manner as with an SO, more than one separate unit mass of ORBS may participate in the starting procedure, and any practical combination of a single or a number of ORBS solid grain(s) 50, fuel injector(s) 54, and igniter(s) 56 is possible. The configuration of the embodiment 2000 is also practical with an ORBS. With all combinations, it is a fact that after use, the ORBS is completely depleted and its decomposition products are expelled, whereby the turbine engine regains its original configuration, being that of a conventional or other turbine engine 10.

A turbine engine may be fitted with one or more ORBSs as an add-on or in retrofit, with the ORBS being replaceable after consumption. Furthermore, the ORBS may be configured in any desired shape and size.

A third alternative version of the embodiments 1000 and 2000, operative with a combination of Oxidizing-species Releasing Material, or ORM, is also practical. Instead of selecting either a solid oxidizer SO, or an Oxidizing-species Releasing Burning Substance ORBS, it is sometimes beneficial to use a combination of both ORMs. With such a combination, the igniter 56 will ignite the fuel/air mixture and the ORBS practically simultaneously. The ORBS will then release oxidizing species, while the heat delivered by the igniter 56 and by the burning ORBS and by the ignited fuel/air mixture will heat the SO that will then decompose and release gaseous oxygen.

The Oxidizing-species Releasing Material, or ORM, may be selected as one solid mass of SO and one solid mass of ORBS disposed adjacent to each other. It is not necessary to limit the third alternative to two adjacent blocks of material, namely of SO and of ORBS. For example, a practical implementation may be configured as a stack of alternate rings, plates, or disks of SO and of ORBS.

It is noted that the mass flow rate of release of gaseous oxygen or of oxidizing species from an ORM, such as respectively, an SO or an ORBS, is predetermined as desired by an appropriate selection of design parameters, such as for example the selected material, the size of the substance particles, the selected configuration, the compacting pressure of the material, and so on. The predetermined mass flow rate is selected a priori according to requirements. For example, as with solid propellant grains, the rate of release of oxidizing species from a decomposing SO, or a burning ORBS, is similar to the well-known rules of consumption of a solid propellant regarding the propagation of the burning front.

A solid ORM device may thus be configured as at least one solid mass that is selected as an SO which is configured to release a predetermined mass flow rate of gaseous oxygen when heated. The heat transferred to the SO at least by operation of the at least one igniter, and possibly also by the combustion process of the fuel/air mixture, and even by a burning ORBS, decomposes the SO. That heating causes the release of gaseous oxygen, which is beneficial for the enhancement of the starting process of the turbine engine 10.

Alternatively, a solid ORM device may be configured as at least one solid mass of ORM that is selected as an ORBS, which is configured to release a predetermined mass flow rate of oxidizing species when ignited to burn. The ignition of the fuel/air mixture and of the ORBS benefit and enhance the starting process of the turbine engine 10.

Still another alternative calls for the at least one solid mass of ORM to be selected as an ORBS and as an SO which are both configured to release a predetermined mass flow rate of, respectively, oxidizing species and gaseous oxygen when, respectively, ignited to burn and heated to decompose. The operation of an igniter 56 releases heat and ignites the ORBS, thereby causing burning thereof and release therefrom of heat and of oxidizing species, and at least heat released by at least one igniter 56 heats the SO thereby causing decomposition thereof and release therefrom of gaseous oxygen, whereby the starting process of the turbine engine is enhanced.

Industrial Applicability

The use of an ORM in association with turbine engines is applicable in the industries related to manufacture, maintenance, and retrofit of turbine engines.

It will be appreciated by persons skilled in the art, that the present invention is not limited to what has been particularly shown and described hereinabove. Rather, the scope of the present invention is defined by the appended claims and includes both combinations and subcombinations of the various features described hereinabove as well as variations and modifications thereof which would occur to persons skilled in the art upon reading the foregoing description. For example, a solid oxidizer SO, or an oxidizing-species-releasing burning substance ORBS, or a combination of both of them, may be employed to assist starting operations within one or more of the combustion chambers of a turbine engine having a plurality of combustion chambers.

List of Items

1000 first embodiment
2000 second embodiment
A air
F front of the engine
ORM oxidizing-species-releasing material
R Rear of the engine
PZ primary zone
SO solid oxidizer
10 engine, turbine engine
12 engine housing
14 mass of ingested air
16 engine air intake
18 interior of the engine
22 compressor
20 shaft
24 turbine
26 rotating assembly, or rotor
28 combustion chamber
30 housing wall
36 outer liner
38 inner liner
39 dome
40 first stream of air flow
42 exterior of the peripheral tube
44 flame tube
46 second stream of air flow
50 solid grain
52 cylindrical sleeve
54 fuel inlet/injector
56 igniter
58 ORM ring
60 inert ring

The invention claimed is:

1. A method for enhancing a starting process of a turbine engine which is configured for:
   (i) ingesting and compressing air, (ii) supplying fuel and creating a controllable combustible mixture of the fuel and air in a combustion chamber of the turbine engine, and (iii) operating at least one igniter coupled to the combustion chamber for releasing heat, transferring the heat, and initiating ignition of the combustible mixture to initiate the starting process, the method comprising:
   providing at least one solid mass of oxidizing-species-releasing material (ORM) in the combustion chamber of the turbine engine, wherein the ORM is selected, alone or in combination, from the group consisting of solid oxidizers (SO), and oxidizing-species-releasing burning substances (ORBS),
   initiating the starting process of the turbine engine in association with the ORM and the operation of the at least one igniter, and
   heating the ORM to release extra oxygen or oxidizing species into the combustion chamber to burn with the supplied fuel, so as to accelerate the turbine engine to above an idle RPM (Revolutions Per Minute) and attain an operational regime.

2. The method according to claim 1, further comprising, when the SO is selected as the ORM, heating the SO to release a predetermined mass flow rate of gaseous oxygen,
   wherein the heat transferred to the SO at least by the operation of the at least one igniter decomposes the SO, thereby causing the release of the gaseous oxygen.

3. The method according to claim 1, further comprising, when the ORBS is selected as the ORM, igniting the ORBS to release a predetermined mass flow rate of gaseous oxidizing species,
   wherein the operation of the at least one igniter ignites the ORBS to burn, thereby causing the release of the gaseous oxidizing species.

4. The method according to claim 1, further comprising, when both the ORBS and the SO are selected as the at least one solid mass of ORM, igniting the ORBS to release a predetermined mass flow rate of the oxidizing species, and heating the SO to release a predetermined mass flow rate of gaseous oxygen, wherein the operation of the at least one igniter ignites the ORBS, thereby causing burning of the ORBS and release of heat and of hot oxidizing species, and wherein at least the heat released by the igniter heats the SO thereby causing decomposition of the SO and the release of the gaseous oxygen.

5. The method according to claim 1, wherein the at least one solid mass of ORM comprises at least one unitary mass of material.

6. The method according to claim 1, further comprising replacing a depleted ORM in the turbine engine.

7. The method according to claim 1, wherein the SO includes substances selected, alone or in combination, from the group of mixtures consisting of perchlorate compounds, nitrate compounds, peroxide compounds, and chlorate compounds.

8. The method according to claim 1, wherein the ORBS includes substances selected, alone or in combination, from the group of mixtures or compounds consisting of elastomeric binders, inorganic oxidizers, organic plasticizers and additives comprising at least one of bonding agents, curing agents, wetting agents, stabilizers, anti-oxidants, catalysts, and burning rate modifiers.

9. The method according to claim 1, wherein when the SO is selected as the at least one solid mass of ORM, the at least one igniter ignites the combustible mixture, and the heat provided by both the igniter and by the combustion of the combustible mixture heats the SO, which thermally decomposes to release gaseous oxygen.

10. The method according to claim 1, wherein when both the ORBS and the SO are selected as the at least one solid mass of ORM, the at least one igniter ignites both the combustible mixture and the ORBS which burns to release the oxidizing species, and wherein the heat provided by the igniter, by the combustion of the combustible mixture, and by the burning of the ORBS heats the SO, whereby the SO thermally decomposes to release gaseous oxygen.

11. The method according to claim 1, further comprising retrofitting the at least one solid mass of ORM into an existing turbine engine.

12. A system including:
a turbine engine which is configured for: (i) ingesting and compressing air, (ii) supplying fuel and creating a controllable combustible mixture of the fuel and air in a combustion chamber of the turbine engine, and (iii) operating at least one igniter for releasing heat, transferring the heat, and initiating ignition of the combustible mixture to initiate a starting process of the turbine engine, and
at least one solid mass of oxidizing-species-releasing material (ORM) which is provided in the combustion chamber of the turbine engine,
wherein the ORM is selected, alone or in combination, from the group consisting of solid oxidizers (SO) which decompose into gaseous oxygen when heated, and oxidizing species releasing burning substances (ORBS), and
wherein the ORM is heated to release extra oxygen or oxidizing species into the combustion chamber to burn with the supplied fuel, so as to accelerate the turbine engine to above an idle RPM (Revolutions Per Minute) and attain an operational regime.

13. The system according to claim 12, wherein:
the SO is adapted to release a predetermined mass flow rate of the gaseous oxygen when heated, and
the heat transferred to the SO by the operation of the at least one igniter decomposes the SO, thereby causing the release of the gaseous oxygen.

14. The system according to claim 12, wherein:
the ORBS is adapted to release a predetermined mass flow rate of gaseous oxidizing species when ignited to burn, and
the operation of the at least one igniter ignites the ORBS, thereby causing the release of the gaseous oxidizing species.

15. The system according to claim 12, wherein:
the ORBS is adapted to release a predetermined mass flow rate of the oxidizing species when ignited to burn and the SO is adapted to release a predetermined mass flow rate of the gaseous oxygen when heated, and
the operation of the at least one igniter releases the heat and ignites the ORBS, thereby causing burning of the ORBS and release of the heat and of hot oxidizing species, and wherein at least the heat released by the igniter heats the SO thereby causing decomposition of the SO and the release of the gaseous oxygen.

16. The system according to claim 12, wherein the at least one solid mass of ORM comprises at least one unitary mass of material.

17. The system according to claim 12, wherein the at least one solid mass of ORM is provided in the turbine engine for one of replacement of a depleted ORM, and for retrofit installation into an existing turbine engine.

18. The system according to claim 12, wherein the SO includes substances selected, alone or in combination, from the group of mixtures consisting of perchlorates compounds, nitrates compounds, peroxides compounds, and chlorates compounds.

19. The system according to claim 12, wherein the ORBS includes substances selected, alone or in combination, from the group of mixtures or compounds consisting of elastomeric binders, inorganic oxidizers, organic plasticizers, and additives comprising at least one of bonding agents, curing agents, wetting agents, stabilizers, anti-oxidants, catalysts, and burning rate modifiers.

20. The system according to claim 12, wherein when the SO is selected as the at least one solid mass of ORM, the at least one igniter ignites the combustible mixture, and the heat provided by both the igniter and by the combustion of the combustible mixture heats the SO, which thermally decomposes to release the gaseous oxygen.

21. The system according to claim 12, wherein when both the ORBS and the SO are selected as the at least one solid mass of ORM, the at least one igniter ignites both the combustible mixture and the ORBS which burns to release the oxidizing species, and wherein the heat provided by the igniter, by the combustion of the combustible mixture, and by the burning of the ORBS heats the SO, whereby the SO thermally decomposes to release the gaseous oxygen.

* * * * *